June 7, 1932. A. G. BUCHAN ET AL 1,861,786
MORTISING MACHINE
Filed Oct. 9, 1930  3 Sheets-Sheet 1

INVENTOR
Andrew G. Buchan
Ira J. Lyons
BY
Chappell & Earl
ATTORNEYS

June 7, 1932.   A. G. BUCHAN ET AL   1,861,786
MORTISING MACHINE
Filed Oct. 9, 1930   3 Sheets-Sheet 2

INVENTOR
Andrew G. Buchan
Ira J. Lyons
BY
Chappell Earl
ATTORNEYS

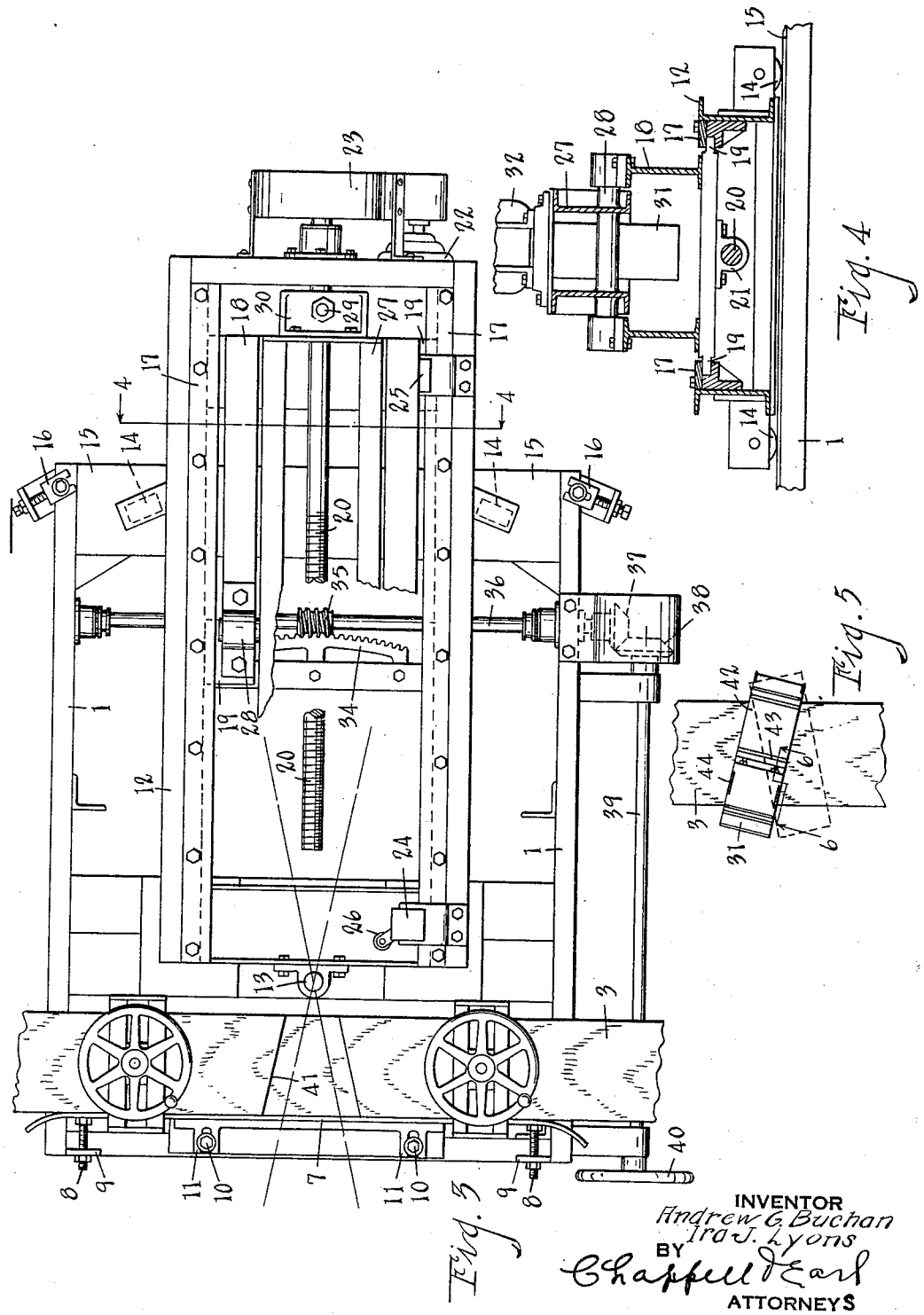

Patented June 7, 1932

1,861,786

UNITED STATES PATENT OFFICE

ANDREW G. BUCHAN AND IRA J. LYONS, OF GRAND RAPIDS, MICHIGAN, ASSIGNORS TO LEITELT IRON WORKS, OF GRAND RAPIDS, MICHIGAN

MORTISING MACHINE

Application filed October 9, 1930. Serial No. 487,550.

The main objects of this invention are:

First, to provide a machine which is well adapted for the mortising of large timbers such, for example, as are commonly employed in cribs, docks, and heavy framing.

Second, to provide a mortising machine which is of very large capacity and performs very accurate work.

Third, to provide a machine having these advantages which is very easy to manipulate.

Objects pertaining to details and economies of our invention will definitely appear from the description to follow. The invention is defined in the claims.

A structure which embodies the features of our invention is clearly illustrated in the accompanying drawings, in which:

Fig. 3 is a fragmentary plan view, certain parts being partially broken away.

Figure 1:
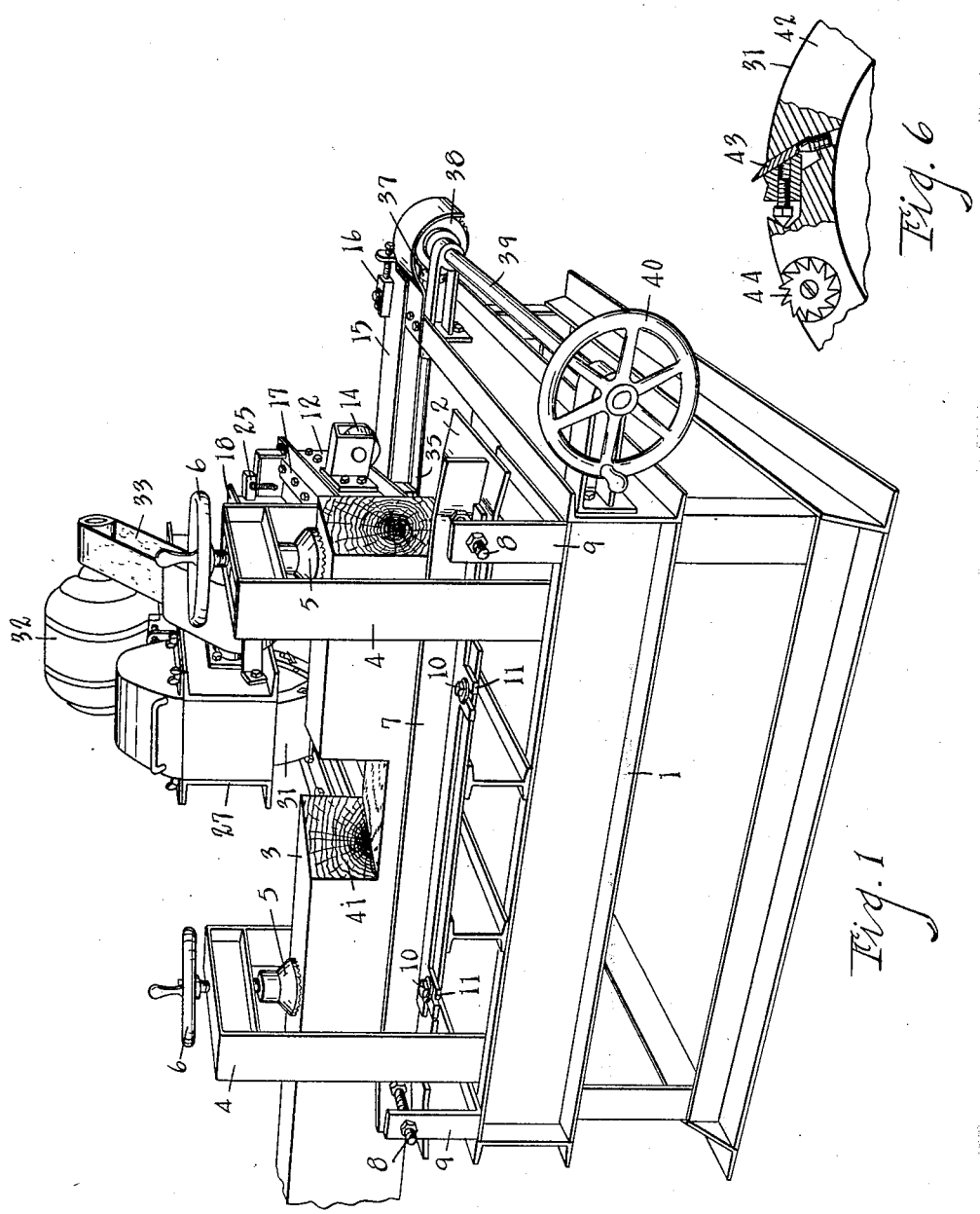
Fig. 1 is a front perspective view of our improved mortising machine, a piece of work being shown therein and partially broken away.
Figure 2:
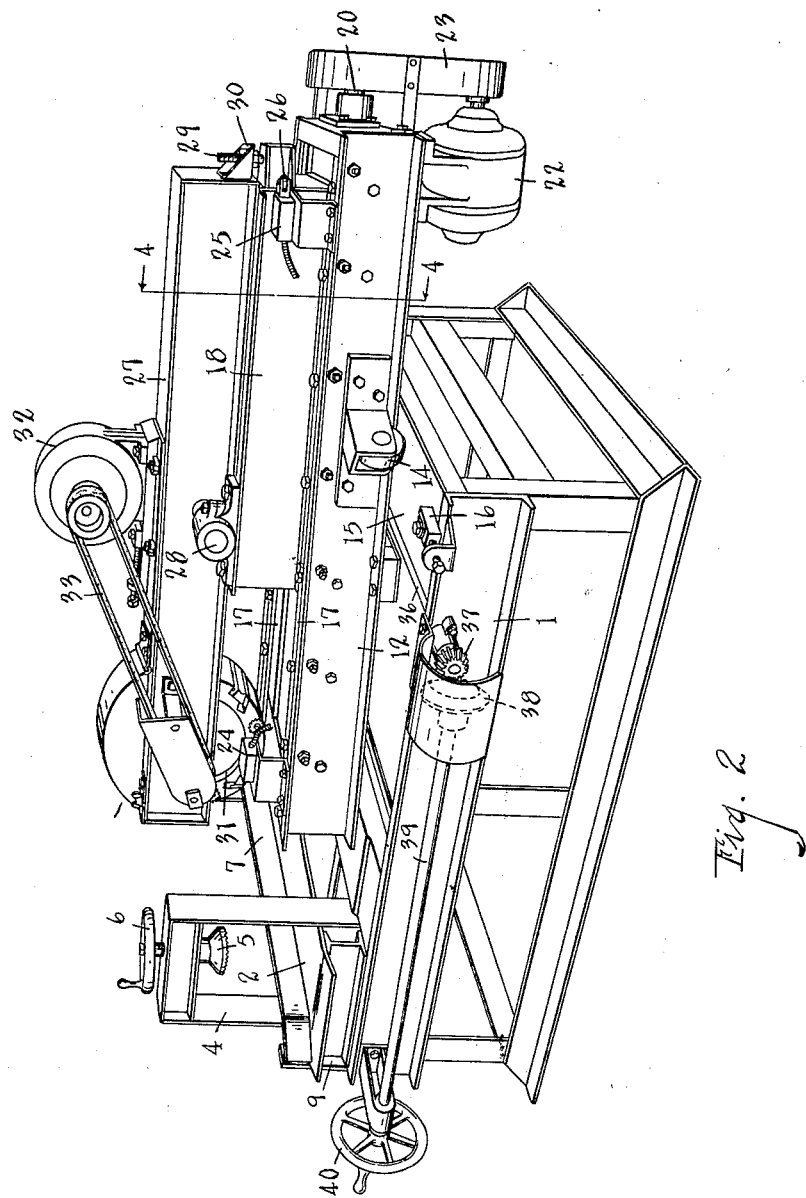
Fig. 2 is a side perspective view.

Fg. 4 is a fragmentary view partially in vertical section on line 4—4 of Figs. 2 and 3.

Fig. 5 is a fragmentary plan view illustrating the operative relation of the cutter to the work, one position being shown by full lines and another by dotted lines.

Fig. 6 is an enlarged detail fragmentary view partially in section of one of the cutters, the cutter illustrated being that of the copending application of Andrew Buchan.

The embodiment of our invention illustrated comprises frame-like bed designated generally by the numeral 1 and designed to support the several operating parts of the machine. The work table 2 is mounted transversely of the bed at the front thereof and is adapted to receive the work 3, such as a beam or timber. Yokes 4 are mounted on the bed to embrace the table and carry clamps 5 operated by screws having hand wheels 6 at their upper ends.

The work gage and rest 7 is adjustably supported by the threaded rods 8 on the uprights 9 and also by bolts 10 on the table which engage slotted lugs 11 on the gage 7.
The carriage bed 12 is pivoted on the frame at 13 adjacent the table and is supported for oscillating movement on this pivot or king bolt by means of the rollers 14 traveling on the flat track 15 at the rear of the frame. Adjustable stops 16 are provided for limiting the swing or travel of the carriage bed. The carriage bed is provided with ways 17 for the carriage 18 which has way-engaging parts 19.

The carriage is driven by the feed screw 20 engaging the feed nut 21 on the carriage. This feed screw is driven from a motor 22 mounted on the rear end of the carriage bed and connected to the screw by a transmission designated generally by the numeral 23. The details of the transmission are not illustrated.

The travel of the carriage is controlled by switches designated generally by the numerals 24 and 25 which are provided with roller tappets 26 engaged by the carriage at the ends of its stroke. The details of the wiring and these switches are not illustrated as they will be readily understood by those skilled in the art, the point being that the carriage is automatically stopped at the end of its stroke.

The beam-like tool holder 27 is pivotally mounted on the carriage at 28 for vertical tilting adjustment so that its forward end may be raised and lowered. This adjustment is effected by the screw 29 mounted on the rear end of the carriage and adjustably secured to the rearwardly projecting ear 30 on the holder by means of nuts arranged on both sides of the ear.

By this arrangement the cutter head 31, which is mounted on the forward end of the holder, may be accurately raised and lowered. The cutter head is driven from a motor 32 mounted on the holder and connected to the cutter head by means of the belt 33 and suitable pulleys. The bed 12 is, in the embodiment illustrated, manually adjusted.

The bed has a segmental rack 34 mounted thereon in coacting relation to the driving worm 35 mounted on the frame. The shaft 36 of this driving worm is provided with a gear 37 meshing with a pinion 38 on the crank shaft 39 which is provided with a hand wheel 40 at its forward end.

With this arrangement the carriage bed is adjusted against one of the stops 16, the work properly clamped in position, and the carriage fed forwardly, taking a cut through the work at an angle to the longitudinal plane of the work, the angle being such as it is desired the mortise shall have. When the first cut is completed the bed is adjusted against the opposite cut and the carriage then retracted, finishing the tapered mortise, while the carriage is on its rearward or retracting stroke.

The cutter in the embodiment illustrated comprises a cutter head 42 having adjustable blades 43 and kerf or dado cutters 44 at the sides of the head. The cutter is made the subject matter of a copending application filed by Andrew G. Buchan.

With the parts thus arranged heavy timbers may be very accurately and rapidly mortised with a minimum of labor.

We have illustrated and described our improvements in an embodiment which we have found very practical. We have not attempted to illustrate or describe other embodiments or adaptations which we contemplate as we believe this disclosure will enable those skilled in the art to embody or adapt our improvements as may be desired.

Having thus described our invention what we claim as new and desire to secure by Letters Patent is:

1. In a machine of the class described, the combination of a frame, a work table, a cutter carriage bed pivotally mounted at its forward end adjacent said table, said frame being provided with a transverse way on which the rear end of said bed is supported for oscillating movement, adjustable stops for limiting the stroke of said bed, a segmental rack on said bed, a driving worm mounted on said frame in coacting relation to said bed, a carriage reciprocatingly mounted on said bed, a driving screw for said carriage mounted on said bed, a driving motor for said screw mounted on said bed, control switches for said motor disposed to be actuated by said carriage at the ends of its travel, a cutter holder pivotally mounted on said carriage for vertical tilting adjustment, means for adjustably supporting said cutter holder on its said pivot, a cutter mounted on the forward end of said cutter holder, and a driving motor for said cutter mounted on said cutter holder.

2. In a machine of the class described, the combination of a frame, a work table, a cutter carriage bed pivotally mounted at its forward end adjacent said table, said frame being provided with a transverse way on which the rear end of said bed is supported for oscillating movement, adjustable stops for limiting the stroke of said bed, a segmental rack on said bed, a driving worm mounted on said frame in coacting relation to said bed, a carriage reciprocatingly mounted on said bed, a cutter holder pivotally mounted on said carriage for vertical tilting adjustment, means for adjustably supporting said cutter holder on its said pivot, a cutter mounted on the forward end of said cutter holder, and a driving motor for said cutter mounted on said cutter holder.

3. In a machine of the class described, the combination of a frame, a work table, a cutter carriage bed pivotally mounted at its forward end adjacent said table, said frame being provided with a transverse way on which the rear end of said bed is supported for oscillating movement, adjustable stops for limiting the stroke of said bed, a segmental rack on said bed, a driving worm mounted on said frame in coacting relation to said bed, a carriage reciprocatingly mounted on said bed, a driving screw for said carriage mounted on said bed, a driving motor for said screw mounted on said bed, control switches for said motor disposed to be actuated by said carriage at the ends of its travel, a cutter holder pivotally mounted on said carriage for vertical tilting adjustment, means for adjustably supporting said cutter holder on its said pivot, and a cutter mounted on the forward end of said cutter holder.

4. In a machine of the class described, the combination of a frame, a work table, a cutter carriage bed pivotally mounted at its forward end adjacent said table, said frame being provided with a transverse way on which the rear end of said bed is supported for oscillating movement, adjustable stops for limiting the stroke of said bed, a segmental rack on said bed, a driving worm mounted on said frame in coacting relation to said bed, a carriage reciprocatingly mounted on said bed, a cutter holder pivotally mounted on said carriage for vertical tilting adjustment, means for adjustably supporting said cutter holder on its said pivot, and a cutter mounted on the forward end of said cutter holder.

5. In a machine of the class described, the combination of a frame, a work table, a cutter carriage bed pivotally mounted at its forward end adjacent said table, said frame being provided with a transverse way on which the rear end of said bed is supported for oscillating movement, a segmental rack on said bed, a driving worm mounted on said frame in coacting relation to said bed, a carriage reciprocatingly mounted on said bed, a driving screw for said carriage mounted on said bed, a driving motor for said screw mounted on said bed, control switches for said motor disposed to be actuated by said carriage at the ends of its travel, a cutter holder mounted on said carriage, a cutter mounted on said cutter holder, and a driving motor for said cutter mounted on said cutter holder.

6. In a machine of the class described, the combination of a frame, a work table, a cutter carriage bed pivotally mounted at its forward end adjacent said table, said frame being provided with a transverse way on which the rear end of said bed is supported for oscillating movement, a segmental rack on said bed, a driving worm mounted on said frame in coacting relation to said bed, a carriage reciprocatingly mounted on said bed, a cutter holder mounted on said carriage, a cutter mounted on said cutter holder, and a driving motor for said cutter mounted on said cutter holder.

7. In a machine of the class described, the combination of a frame, a work table, a cutter carriage bed pivotally mounted at its forward end adjacent said table, said frame being provided with a transverse way on which the rear end of said bed is supported for oscillating movement, a segmental rack on said bed, a driving worm mounted on said frame in coacting relation to said bed, a carriage reciprocatingly mounted on said bed, a driving screw for said carriage mounted on said bed, a driving motor for said screw mounted on said bed, control switches for said motor disposed to be actuated by said carriage at the ends of its travel, a cutter holder mounted on said carriage, and a cutter mounted on said cutter holder.

8. In a machine of the class described, the combination of a frame, a work table mounted on said frame transversely thereof, yokes on said frame embracing said work table, work clamps on said yokes, an adjustable side gage operatively associated with said table, a cutter carriage bed pivotally mounted at its forward end adjacent said table, said frame being provided with a transverse way on which the rear end of said bed is supported for oscillating movement, means for adjusting said bed, a cutter holder pivotally mounted on said carriage for vertical tilting adjustment, means for adjustably supporting said cutter holder on its said pivot, and a cutter mounted on the forward end of said cutter holder.

9. In a machine of the class described, the combination of a frame, a work table mounted on said frame transversely thereof, yokes on said frame embracing said work table, work clamps on said yokes, an adjustable side gage operatively associated with said table, a cutter carriage bed pivotally mounted at its forward end adjacent said table, said frame being provided with a transverse way on which the rear end of said bed is supported for oscillating movement, means for adjusting said bed, a cutter holder mounted on said carriage, and a cutter mounted on said cutter holder.

10. In a machine of the class described, the combination with a work holder means, of a cutter carriage bed pivotally supported at its end adjacent said work holder means for oscillating adjustment, a carriage reciprocatingly mounted on said bed to travel transversely of the work, driving means for said carriage including a motor mounted on said bed, control switches for said motor disposed to be actuated by the carriage at the ends of its travel, a cutter holder mounted on said carriage, and a cutter on said cutter holder.

In witness whereof we have hereunto set our hands.
    ANDREW G. BUCHAN.
    IRA J. LYONS.